United States Patent [19]

Sipe

[11] 4,018,038
[45] Apr. 19, 1977

[54] HAND RAKE WITH GRASPING TINES

[76] Inventor: Charles B. Sipe, 4121 Glencairn Lane, Indianapolis, Ind. 46226

[22] Filed: Jan. 5, 1976

[21] Appl. No.: 646,858

[52] U.S. Cl. ............................................ 56/400.12
[51] Int. Cl.[2] ............................................ A01D 7/10
[58] Field of Search ....... 56/400.12, 400.11, 400.1, 56/400.16, 400.17; 294/106, 107, 104, 19 R, 19 A

[56] References Cited

UNITED STATES PATENTS

| 120,440 | 10/1871 | Howard | 294/107 |
|---|---|---|---|
| 503,176 | 8/1893 | Stanton | 294/106 |
| 1,160,282 | 11/1915 | Harris et al. | 56/400.11 |
| 3,041,102 | 6/1962 | Day | 294/19 R |
| 3,264,809 | 8/1966 | Jackson | 56/400.12 |
| 3,601,966 | 8/1971 | Kerry | 56/400.12 |

Primary Examiner—Louis G. Mancene
Assistant Examiner—James D. Hamilton
Attorney, Agent, or Firm—Charles E. Lanchantin, Jr.

[57] ABSTRACT

A hand rake with grasping tines is disclosed including a pair of multitined fork members, a frame assembly for pivotally holding the fork members in spaced facing relation, a handle assembly secured to the frame assembly for carrying the fork members, and a control mechanism for cooperatively varying the pivotal dispositions of the fork members from an open material raking condition to a closed material transporting condition.

10 Claims, 3 Drawing Figures

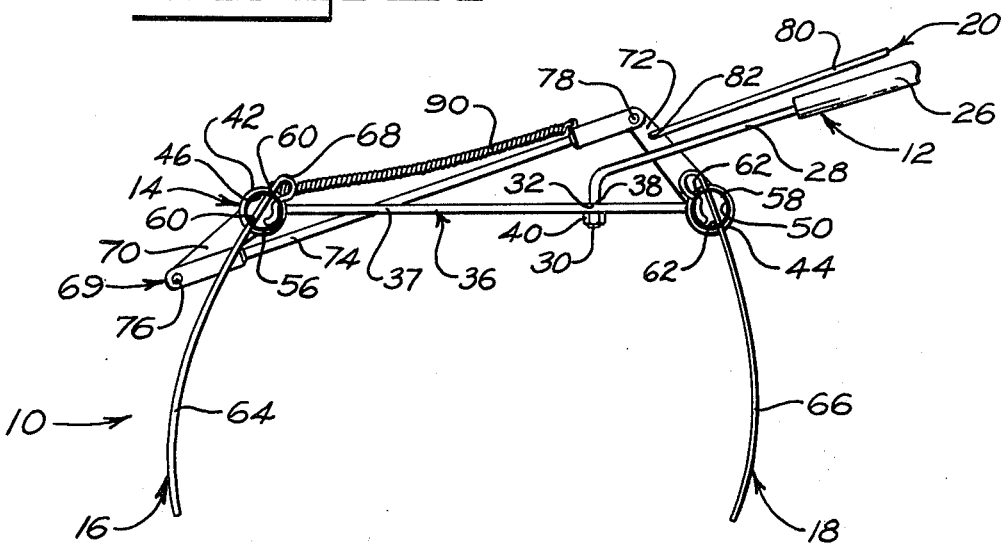
Fig_2_
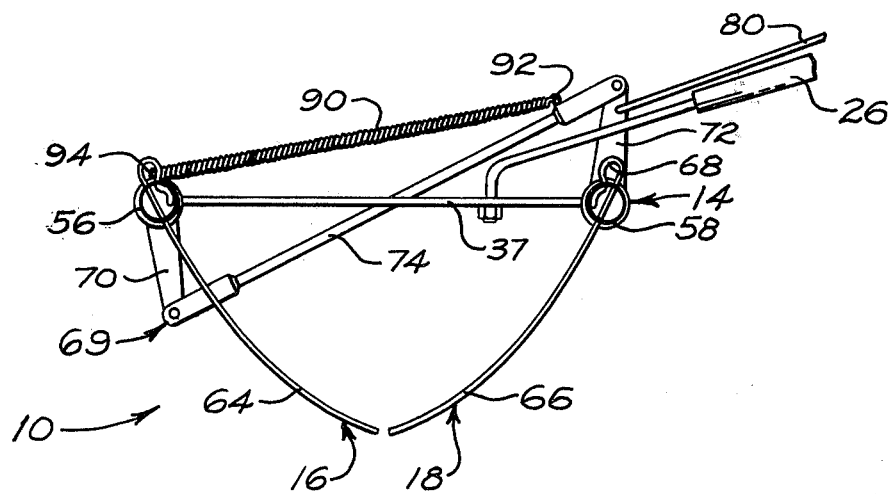
Fig_3_

HAND RAKE WITH GRASPING TINES

BACKGROUND OF THE INVENTION

Hand rakes for gathering various materials such as leaves, hay, straw, and the like have been used for centuries with little change in construction. Basically, such rakes consist of a long wooden handle which is grasped by the user at one end, and a bar with depending teeth on it at the other end. In order to gain additional penetration to smooth the soil, some rakes have a heavier bar with short stiff tines. While other rakes, of somewhat different usefulness, have a lighter construction with long flexible fingers.

Even though hand rakes have long remained unchanged, they still exhibit the same handling problems. For example, while the short, stiff-tined rakes enable embedded and soggy leaves to be dislodged, considerable care must be taken not to damage or tear up the grass lawn on which the leaves often rest. Furthermore, the short tines have a tendency to pierce and collect the leaves so that in a relatively brief period the rake is clogged.

For these reasons, rakes with long flexible fingers are usually preferred for raking up lawn clippings and leaves. This is so because their longer tines deflect to reduce grass tearing and leaf clogging. On the other hand, it is often necessary to exert considerable downward force on such rakes in order to dislodge the embedded leaves and to rake them into a pile.

Another major problem with both of these types of rakes is that the user must bend down and push the gathered material against the rake with one hand while grasping the handle in the other in order to lift the material for placement in a suitable container. Alternately, the user must drop the rake in order to gather and to transport the piled material with two hands. In either case, an excessive amount of energy is consumed by having to repetitiously bend down to pick up the material, and the user finishes his task tired and dirty.

SUMMARY AND OBJECTS OF THE INVENTION

Accordingly, in order to minimize many of the aforementioned problems, it is an object of the present invention to provide a simple and economical hand rake of multi-purpose versatility so that the user will be able to finish his raking task with less fatigue and in a relatively clean condition.

Another object of the present invention is to provide a hand rake of the aforementioned type which is better able to rake up either loose material in a relatively rapid manner, or difficult-to-dislodge material from a lawn or the like with minimal damage to the lawn.

Another object of the present invention is to provide a hand rake of the character described which is also selectively capable of grasping and transporting gathered material.

Other objects and advantages of the present invention will become more readily apparent upon reference to the accompanying drawings and the following description.

BRIEF DESCRIPTION OF THE DRAWINGS

FIG. 2 is a left side elevational view of the front portion of the hand rake illustrated in FIG. 1.

FIG. 3 is a fragmentary side elevational view of the hand rake of the present invention similar to FIG. 2, only illustrating it with the fork members in a closed material transporting condition.

DESCRIPTION OF THE PREFERRED EMBODIMENT

Figure 1:
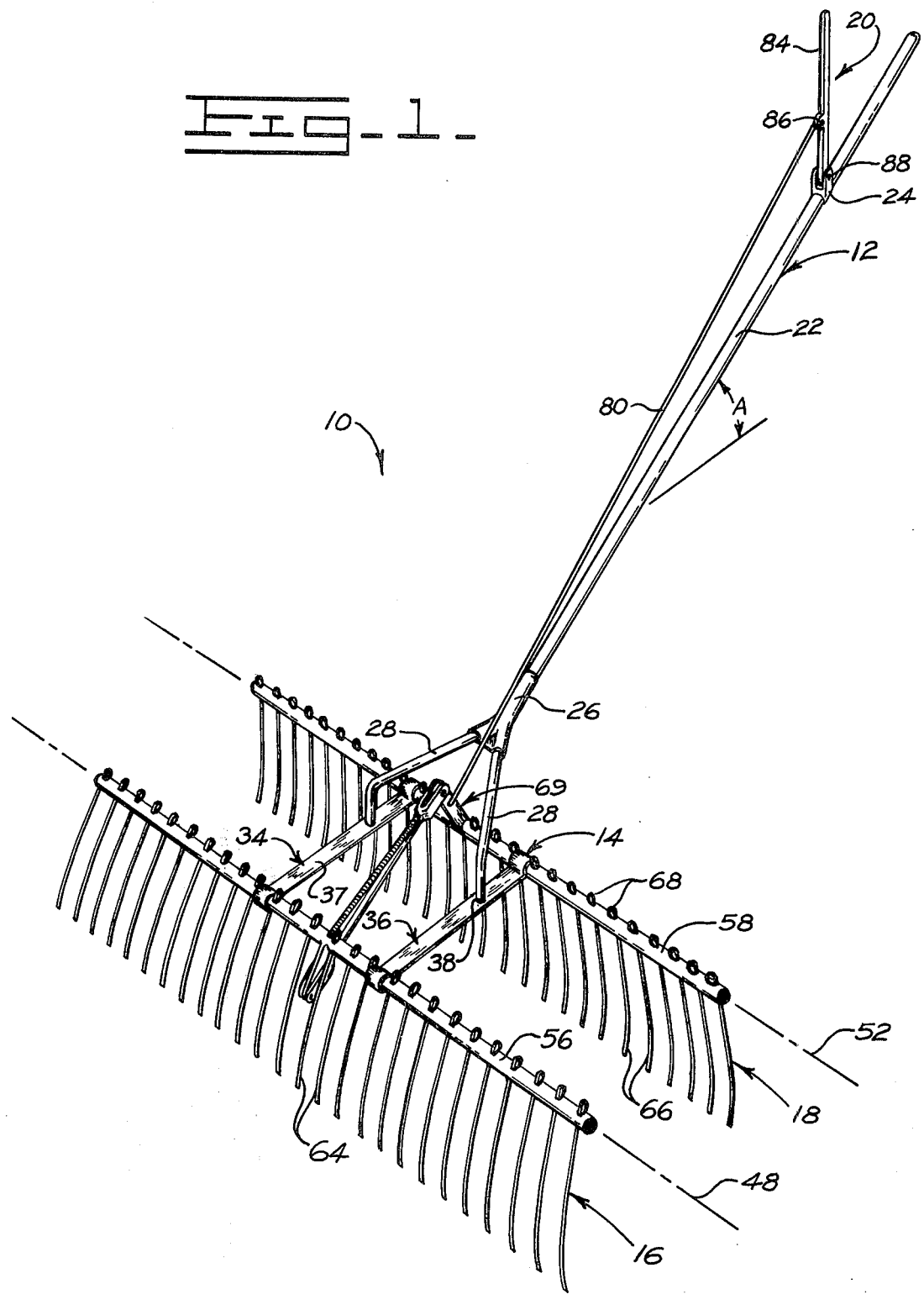
FIG. 1 is a front oblique, three-dimensional elevational view of the hand rake of the present invention with the multitioned fork members thereof illustrated in an open material raking condition.

Referring now to FIG. 1, the hand rake 10 of the present invention basically includes an elongated handle assembly 12, a frame assembly 14 secured thereto, a pair of multitined fork members 16 and 18 pivotally secured to the frame assembly, and a control apparatus or mechanism 20 for swinging the fork members graspingly together when desired.

More particularly, the handle assembly 12 includes an elongated wooden handle 22 having an upstanding yoked member 24 secured thereto near its upper extremity, and a socketed bracket 26 of Y-shaped construction secured thereto at its distal end. A pair of support struts 28 divergingly depend from the socketed bracket, and as representatively shown in FIG. 2 each of these struts has a threaded portion 30 at its lower extremity which forms a shoulder 32 at the upper end thereof.

As is clearly illustrated in FIGS. 1 and 2, the frame assembly 14 of the hand rake 10 includes a pair of parallel fork holding elements 34 and 36 which extend longitudinally or in substantially the same direction as the handle 22. Each of these holding elements has an elongated flat strap 37 centrally thereof with a vertically extending opening 38 therethrough, which openings are adapted to receive the threaded portions 30 of the support struts 28. In this way an internally threaded nut 40 may be screw threaded upwardly on the threaded portion of each strut to secure the fork holding elements to the handle assembly 12.

More particularly, and as best shown in FIG. 2, each of the fork holding elements 34 and 36 includes a front cylindrical housing 42 and a rer cylindrical housing 44 which are integrally disposed on the opposite ends of the straps 37. A cylindrical passage or internal bearing surface 46 is defined in each of the front housings in such a manner that they laterally alignably provide a common front pivot axis 48 as indicated in FIG. 1. Similarly, a cylindrical passage or internal bearing surface 50 is defined in each of the rear housings to alignably provide a common rear pivot axis 52.

As is now clearly apparent, the front fork member 16 has a tubular body 56 which extends closely through the aligned front passages 46 in the holding elements 34 and 36 so that it is positively guidably supported at laterally spaced points for rotation about the front pivot axis 48. Likewise, the rear fork member 18 has a tubular body 58 which extends through the rear passages 50 so that it is stabilizingly supported for rotation about the rear axis 52. Each of these tubular bodies is of similar length and of light weight construction, such as being made from thin-walled metal tubing.

As indicated in FIG. 2, a plurality of substantially equally laterally spaced tine-receiving opening 60 are formed in the upper and lower portions of the front tubular body 56 is aligned upright pairs, and a corresponding plurality of similar openings 62 are defined in the rear tubular body 58. These openings respectively accept a plurality of arcuately profiled front tines 64 and a facing plurality of arcuately profiled rear tines 66 therethrough. The tines are preferably made from flexibly resilient, thin steel strips with an integrally formed hook or clasp 68 at the upper end thereof. Consequently, each tine may be inserted downwardly through the aligned openings until the hook is snappingly engaged positively in place within the tubular bodies. This simple and economical tine attachment construction is known in the art for hand rakes having a single fork member.

In accordance with one aspect of the invention, the control mechanism 20 allows conveniently selectable pivotal movement of the fork members 16 and 18 on the frame assembly 14. To accomplish this, such mechanism includes a coupling arrangement 69 interconnecting the fork members including a generally depending arm 70 integrally secured to the front tubular body 56 centrally thereof, and a generally upstanding arm 72 similarly secured to the rear tubular body 58 as shown in FIG. 2. These arms are coupled together by an elongated yoked rod 74 which is pivotally secured to the depending arm at a pivot joint 76 and to the upstanding arm at a pivot joint 78. Furthermore, an elongated control rod 80 is secured to the upstanding arm at a pivot joint 82, and is thereafter arranged to extend toward the upper rear extremity of the handle 22 as shown in FIG. 1. At the upper end thereof the control rod is secured to a control lever 84 at a pivot joint 86, which lever is rockably secured to the yoked member 24 at a pivot joint 88.

It can now be appreciated that the hand rake of the present invention can be selectively manipulated from an open material raking condition as illustrated in FIGS. 1 and 2, into a material grasping and carrying condition as shown in FIG. 3. This is achieved by depressively swinging the control lever 84 toward the handle 22, whereupon the control mechanism 20 pivotally rotates the fork members 16 and 18 toward one another as is clearly apparent upon comparing FIGS. 2 and 3. A coiled tension spring 90, coupled to the upper extremity of the yoked rod 74 at a pivot joint 92 and to the central upper surface of the front tubular body 56 at pivot joint 94, is thereby extended with this action. Consequently, leaves or the like carried by the closed rake can be easily dumped because the spring aids in returning the rake to its open condition upon releasing the control lever.

OPERATION

While the operation of the present invention is clearly apparent from the above description, further amplification thereof is set forth in the following summary of such operation. Advantageously, when the hand rake 10 is disposed in its raking condition, as shown in FIG. 1 the total weight thereof is relatively uniformly supported on both the front and rear fork members 16 and 18. Consequently, the front tines 64 and the rear tines 66 have little tendency to tear up a fine grass lawn as the rake is sequentially stroked across it. On the other hand, the user benefits by the fact that both sets of tines serve to move the leaves or other debris in a desired direction. This action is achieved with the handle 22 forming a predetermined inclination angle with respect to a horizontal plane. Such an inclination angle is designated as angle A in FIG. 1, and is within a range of from 20° to 30°, and preferably approximately 25°.

In accordance with one aspect to the invention, however, the upper rear end of the hand rake may be raised to pivot it about the aligned lower extremities of the front tines 64 in order to distribute a larger proportion of the rake's total weight on the front fork member 16 and a lesser proportion on the rear fork member 18. This is an almost automatic and effortless operation, since all that is necessary is to increase the angle of the rake to something more than the predetermined inclination angle A. If a particularly difficult mass of soggy leaves has to be dislodged from the grass, it might be necessary to further elevate the handle. In the instant embodiment, when the inclination angle A is greater than approximately 28° or 30° substantially all loading is relieved from the rear tines 66, since they are then disposed at some elevationally spaced distance above the ground. Moreover, because the total weight of the hand rake of the present invention is slightly heavier than a conventional hand rake and the front tines alone can be used for penetration, then even deeply embedded leaves can be more easily dislodged.

On the other hand, after the hand rake quickly forms piles of material by virtue of the dual action of both the front tines 64 and the rear tines 66, the leaves may be lifted and placed into a suitable container, not shown, in the following manner. With the front and rear fork members 16 and 18 disposed on either side of the pile, the lever 84 is rocked rearwardly about the pivot joint 88 to a depressed condition substantially parallel to the handle 22 where it may be easily held thereto. This moves the control rod 80 rearwardly and as visualized with reference to FIG. 2, the upstanding arm 72 is then caused to rotate in a clockwise direction when viewing the drawing. Since the yoked rod 74 is coupled to the upstanding arm, it is also moved rearwardly, whereupon the depending arm 70 is rotated in a counterclockwise direction. This relationship may be appreciated by reference to both FIGS. 2 and 3. As the arms are thus rotated, the faacing tines 64 and 66 swing toward one another into a grasping condition whereupon the lower extremities thereof are disposed in a substantially colinear relationship. If desired, however, the front and rear tines may be laterally offset to effect an overlappingly interlocking relationship therebetween.

With the fork members 16 and 18 in the load carrying condition illustrated in FIG. 3, the hand rake 10 may be lifted and placed above a container whereupon the control mechanism 20 can be manipulated to release the relatively substantial load into it. The coordinated rotation of the arms 70 and 72, and the return of the control lever 84 to an upright position is thereafter aided by the progressive release of tension in the extended spring 90. Upon reaching the open raking condition of FIG. 2, the spring is substantially relaxed or unloaded. However, the spring still serves at such time to maintain the control mechanism and the fork members in their respective open positions as shown.

Therefore, it may now be appreciated that the hand rake of the present invention is an extremely versatile service tool of rugged and yet economical construction. Not only does it have, in effect, single or dual fork member action to match the varying ground conditions so often experienced, but also it can selectively grasp a pile of loose material for transport purposes. In this regard, the hand rake of the present invention has a relatively high carrying capacity, so that the user can more quickly and conveniently accomplish the clean up task without having direct hand contact with the material.

While the invention has been described and shown with particular reference to a single embodiment, it will be apparent that variations might be possible that would fall within the scope of the present invention, which is not intended to be limited except as defined in the following claims.

What is claimed is:

1. A hand rake with grasping tines comprising,
   a pair of multitined fork members,
   frame means for pivotally holding both of said fork members for rocking movement about a pair of separated pivot axes,
   handle means secured to said frame means for carrying said fork members, and
   mechanism means for cooperatively varying the pivotal dispositions of both of said fork members with respect to said frame means from an open material raking condition to a closed material transporting condition.

2. The hand rake of claim 1 wherein each of said fork members has a tubular body and a plurality of flexibly resilient tines dependingly secured thereto.

3. The hand rake of claim 2 wherein said frame means includes front bearing means and rear bearing means respectively disposed in alignment with said axes for pivotally supporting said tubular bodies of said fork members.

4. The hand rake of claim 3 wherein said mechanism means includes coupling means intermediately connected between said tubular bodies for affecting simultaneously coordinated opening or closing movement of said fork members.

5. The hand rake of claim 4 wherein said mechanism means includes a control lever rockably coupled to said handle means and means connected to said control lever and said coupling means for selectively manipulating said coupling means.

6. The hand rake of claim 5 wherein said mechanism means includes spring means for loadably biasing said mechanism means and both of said fork members pivotally apart and into said open condition.

7. A hand rake with grasping tines comprising,
   a pair of fork members individually having a plurality of flexible tines,
   a frame assembly for pivotally holding both of said fork members for rocking movement about a pair of longitudinally spaced apart and parallel pivot axes,
   a handle which is effectively secured to said frame assembly for carrying said fork members, and
   a control mechanism for cooperatively and simultaneously varying the pivotal dispositions of both of said fork members and said flexible tines with respect to said frame assembly from an open material raking condition to a closed material transporting condition.

8. The hand rake of claim 7 wherein said control mechanism includes coupling means connected between said fork members for effecting simultaneous opening or closing movement of them both relative to said frame assembly.

9. The hand rake of claim 8 wherein said control mechanism includes rockable lever means mounted on the upper end of said handle and operatively connected to said coupling means for allowing convenient selective manipulation of said coupling means and said fork members with a relatively high mechanical advantage.

10. The hand rake of claim 9 including resilient means for loadably biasing said control mechanism and both of said fork members pivotally apart and toward said open condition.

* * * * *